Patented Mar. 17, 1936

2,033,921

UNITED STATES PATENT OFFICE 2,033,921

SOLUTION OF ERGOT ALKALOIDS

Walter G. Christiansen, Bloomfield, N. J., and John Lee, Brooklyn, N. Y., assignors to E. R. Squibb & Sons, New York, N. Y., a corporation of New York No Drawing. Application August 28, 1931, Serial No. 559,928

2 Claims. (Cl. 167—67)

This invention relates to solutions of substances that dissolve only scantily or unstably in water.

Numerous substances potentially of great therapeutic value are unduly restricted in use because of either their practical insolubility in water or the instability of their aqueous solutions.

It is the object of this invention to provide stable and water-diluable solutions of such substances, adapted for therapeutic use.

We have found that such substances form stable solutions in vehicular compounds of the general formula

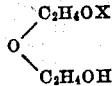

wherein X represents hydrogen or an alkyl (i. e., dihydroxy ethyl ether and the mono-alkyl ethers thereof), especially ββ'dihydroxy ethyl ether and its ethyl and butyl ethers; that such solutions are diluable with water; and that such solutions and the aqueous dilutions thereof constitute forms in which such substances may be efficiently administered.

Our vehicular compounds are colorless liquids, freely miscible with water; and certain of them, particularly the mono-ethyl ether of ββ' dihydroxy ethyl ether, are furthermore characterized by relatively low toxicity, causing no irritation when applied to the skin or sensitive membranes and very little when administered intramuscularly or subcutaneously, and being tolerated in dilute aqueous solutions by the eyes.

Not only do our vehicular compounds dissolve with facility and in comparatively large proportions the substances under consideration, but the resulting solutions and their aqueous dilutions do not deteriorate by hydrolysis or otherwise. Furthermore, our vehicular compounds are utilizable as reaction media in the preparation of double salts, since preliminary solution of the components of such double salts is generally essential.

Among the substances of which stable and water-diluable solutions, adapted for therapeutic use, may be prepared in accordance with our invention are:

1. Glucosides. For example, digitalis glucosides, which in aqueous solution lose therapeutic activity by hydrolysis, dissolve in the mono-ethyl ether of ββ'dihydroxy ethyl ether to give solutions from which the solutes are not precipitated upon the addition of water; and solutions of strophanthin and scillitoxin in the mono-ethyl ether of ββ'dihydroxy ethyl ether (say .003 g. of the first or .02 of the second in 10 cc. of the third) are not disturbed by unlimited aqueous dilution. Solution may be made directly in the mono-ethyl ether of ββ'dihydroxy ethyl ether; but glucosidal extracts of viscous consistency are more conveniently dissolved in methyl alcohol, the solution added to the mono-ethyl ether of ββ'dihydroxy ethyl ether, and the liquid maintained under vacuum, first at 50° C. for several hours and then at room temperature for two days, to remove the methyl alcohol.

2. Alkaloids. For example, ergot alkaloids and quinine dissolve readily in the mono-ethyl and the mono-butyl ethers of ββ'dihydroxy ethyl ether, the quinine forming with them ten-percent solutions to which, respectively, 1 and 3.2 volumes of water may be added without causing precipitation; and .005 g. of aconitine dissolved in 10 cc. of the mono-ethyl ether of ββ'dihydroxy ethyl ether may be diluted indefinitely with water.

3. Azo dyes. For example, para - ethoxy phenyl azo diamino benzene and the hydrochloride thereof, which are respectively insoluble and slightly soluble in water, give two-percent solutions in the mono-ethyl ether of ββ'dihydroxy ethyl ether; and phenetyl azo diamino benzene, its hydrochloride, phenetyl azo αα'diamino pyridine, phenyl azo 2,4-diamino benzene, and phenyl azo αα'diamino pyridine hydrochloride, respectively, form with the mono-ethyl ethers of dihydroxy ethyl ether one-, five-, five-, five-, and two-percent solutions, diluable with one, ten, one-fourth, one-half, and ten volumes of water.

4. Double salts of heavy metals such as bismuth, silver, and mercury, especially with potassium or an organic base like quinine. For example, quinine bismuth iodide, a valuable antiluetic, which hitherto has been available for intramuscular administration only in crude suspensions, dissolves in the mono-ethyl ether of ββ'dihydroxy ethyl ether without difficulty, and this solvent action is intensified by the addition of sodium iodide—the proportions of one useful solution being 7.5 g. of quinine bismuth iodide, 15 g. of dry sodium iodide, and 75 cc. of the mono-ethyl ether of ββ'dihydroxy ethyl ether—; ten-percent solutions of quinine bismuth iodide and sodium bismuth iodide in the mono-butyl ether of ββ'dihydroxy ethyl ether can be diluted with between 2 and 3 parts of water without precipitation; potassium silver iodide and potassium mercury iodide, which hydrolyze in dilute aqueous solutions, dissolve readily in ββ'dihydroxy ethyl ether, a clear solution of the former being made by treating 235 g. of silver iodide with 2500 g. of ββ'dihydroxy ethyl ether and gradually stirring in 170 g. of potassium iodide; and a thirty-percent solution of potassium silver iodide in the mono-butyl ether of ββ'dihydroxy ethyl ether is stable.

5. Barbituric acid derivatives. For example, ten-percent solutions of ethyl isopropyl barbituric acid in the mono-ethyl and the mono-butyl ethers of ββ'dihydroxy ethyl ether require considerable dilution with water—in the latter case 2.2 volumes—before precipitation commences; and ten-percent solutions of diethyl barbituric acid and phenyl ethyl barbituric acid in the mono-ethyl ether of ββ'dihydroxy ethyl ether are readily made and will stand the addition of at least one-half volume of water without yielding crystals.

6. Substituted phenols, especially hydroxy diphenyl and alkyl, alkylene, and halogen derivatives thereof. For example, a ten-percent solution of thymol in, and a solution of .15 g. of hexyl resorcinol in 1 cc. of, the mono-ethyl ether of ββ'dihydroxy ethyl ether, are respectively miscible with one-half and three volumes of water; and a clear .25% solution of 2-hydroxy 5-normal-propyl diphenyl in the mono-ethyl ether of ββ'dihydroxy ethyl ether can be diluted with two volumes of water without producing more than a faint trace of opalescence.

7. Terpenes. For example, menthol readily forms a ten-percent solution in the mono-ethyl ether of ββ'dihydroxy ethyl ether; and ten-percent solutions of natural camphor in the mono-ethyl and the mono-butyl ethers of ββ'dihydroxy ethyl ether are respectively diluable with almost an equal volume and 3.5 volumes of water before they begin to precipitate.

8. Organic acids. For example, twenty-percent solutions of salicylic, acetyl salicylic, and benzoic acids, respectively, in the mono-ethyl ether of ββ'dihydroxy ethyl ether may be prepared without difficulty, the last-named giving with an equal volume of water a stable, though opalescent, dilution.

9. Phenolphthalein. For example, this substance, which is very scantily soluble in water, readily yields in the mono-ethyl ether of ββ'dihydroxy ethyl ether a ten-percent solution the homogeneity of which is not disturbed by the addition of an equal volume of water.

10. Iodine. For example, a ten-percent solution of this element in the mono-ethyl ether of ββ'dihydroxy ethyl ether is easily made.

It is to be understood that the foregoing embodiments are merely illustrative and by no means limitative of our invention, which may assume various other forms—for example, with respect to the particular solvents and solutes and the proportions of the solutions and of their aqueous dilutions—within the scope of the appended claims.

We claim:

1. A therapeutic composition comprising a solution of ergot alkaloids in a compound of the general formula

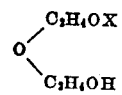

wherein X represents hydrogen or an alkyl.

2. A therapeutic composition comprising a solution of ergot alkaloids in the mono-ethyl ether of ββ'dihydroxy ethyl ether.

WALTER G. CHRISTIANSEN.
JOHN LEE.